3,280,628
HIGH PRECISION CAPACITIVE STRAIN GAGE
Fred Schloss, Arlington, Va., assignor to the United States of America as represented by the Secretary of the Navy
Filed Mar. 31, 1964, Ser. No. 356,328
12 Claims. (Cl. 73—301)

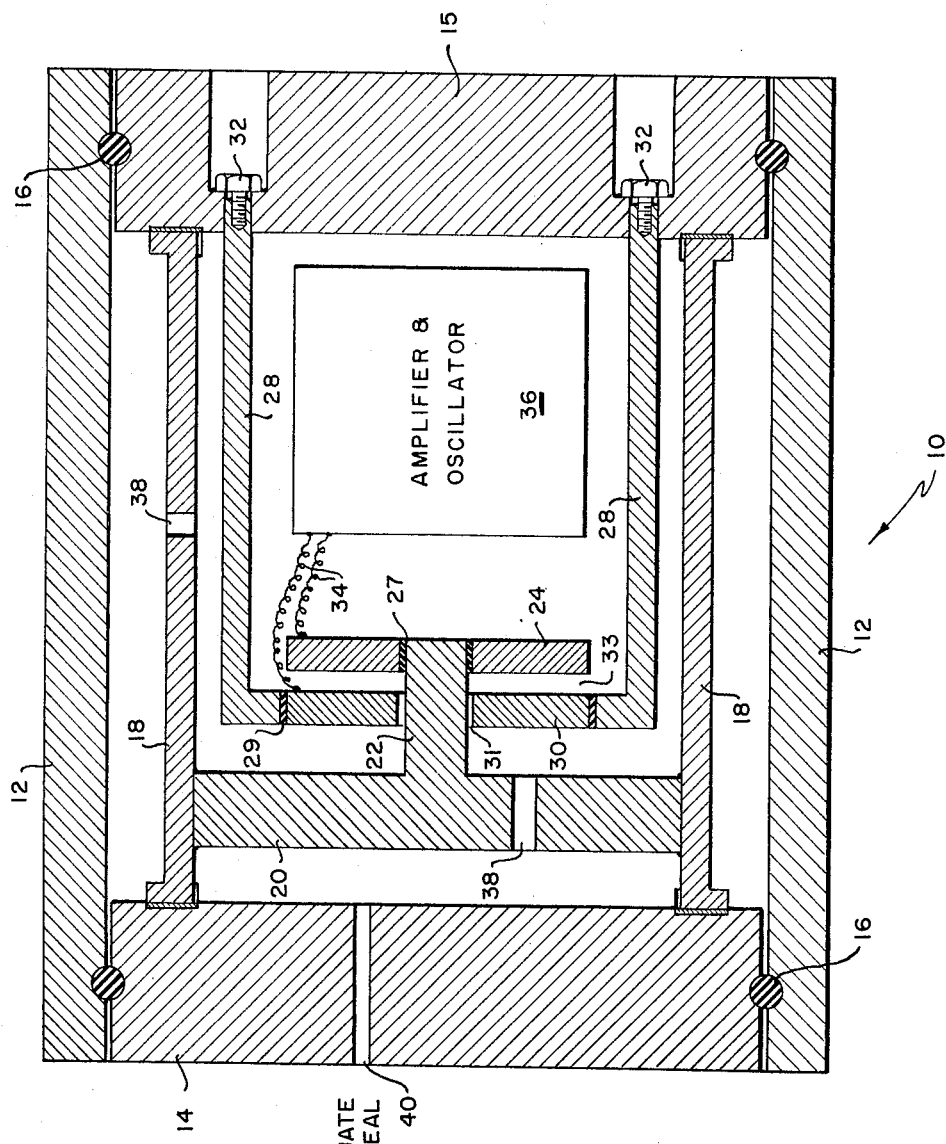

The invention described herein may be manufactured and used by or for the Government of the United States of America for governmental purposes without the payment of any royalties thereon or therefor.

This invention relates to improvements in high precision strain gages, depth gages, hydrophones, accelerometers etc. and more particularly to such a new and improved device to measure depth, pressure, acceleration, force, torque and so forth.

The conventional metal foil and semiconductor strain gages heretofore used where affected by hysteresis and temperature and limited in the force they could measure since breakage would occur.

The general purpose of this invention is to provide a capacitive strain gage which embraces all the advantages of similarly employed strain gages and possess none of the aforementioned disadvantages. To attain this, the present invention contemplates a unique arrangement in that a vacuum is used as a dielectric, a material of the lowest thermal coefficient of expansion is used and axial strain multiplication is used.

Another object of this invention is to provide a capacitive strain gage that behaves linearly without hysteresis over a very wide range of strain.

Another object of this invention is a strain gage capable of measuring strains of one inch per inch or greater.

Still another object of this invention is to provide a strain gage of great sensitivity.

Yet still another object of this invention is to provide a capacitive strain gage whose dielectric changes a negligible amount with a change in temperature.

And yet still another object of this invention is to provide a gage which readily serves to control the frequency of an oscillator thus making it possible to accurately indicate the measured quantity over very long cables.

Other objects and many of the attendant advantages of this invention will be readily appreciated as the same becomes better understood by reference to the following detailed description and claims when considered in connection with the accompanying drawing.

The sole figure illustrates the preferred embodiment of the invention wherein there is shown a capacitive type strain gage generally referred to by the reference numeral 10. A housing 12 encloses the strain gage and is preferably made of stainless steel. The housing 12 is closed at each end by pistons 14 and 15. The pistons 14 and 15 are free to move within the housing 12, but at the same time are sealed to the housing by appropriate seals 16, for example O rings or molded polyurethane.

A tube 18 is solidly fastened between the two pistons 14 and 15. To avoid the effect of temperature the tube would ideally be made of a material having a zero coefficient of thermal expansion. The preferred or closest to ideal material is one from the constant modulus alloy group.

One such alloy from this group is a iron-nickel base alloy, Ni Span C which is an H. A. Wilson & Co. tradename for an alloy having approximately 42% nickel, 5.4% chromium, 2.4% titanium, 0.6% aluminum and 49.6% iron. If properly treated, the coefficient of thermal expansion of Ni Span C can be reduced to approach zero. A suitable treatment of this alloy is to have the solid solution annealed plus 50% coldworked (29C Rockwell) rough machine, heat treated or aged at 1250° F. and then machined finally. Another suitable treatment is to have the solid solution annealed, rough machined, aged or heat treated at 1350° F. and then machined finally. The effect of temperature on Ni Span C is less than 0.1 part per million per C.

To one end of the tube 18 is attached a fixture 20. A stem 22 affixed to the fixture 20 spaces a condenser plate 24 within the tube cavity tube 26. The plate 24 is fixed to the stem 22 at the center of the plate 24 by a bonding agent or cement 27 which also electrically insulates the condenser plate 24 from the stem 22. At the other end of the tube 18, a cylinder 28 is secured within the tube cavity 26, to the piston 15. The other end of the cylinder 28 is bonded at 29 to the peripheral edge of a second condenser plate 30. The second condenser plate 30 lies between the closure 20 and condenser plate 24. The bond 29 also electrically insulates the second condenser plate 30 from the cylinder 28. The cylindrical gap 31 between the second condenser plate 30 and the stem 22 is made as large as possible to reduce stray capacitance, the spacing 33 between the condenser plates 24 and 30, in an arrangement as shown in the drawing, is made as small as possible under the minimum pressure at which it is to be used for example, at atmospheric pressure if used as a depth gage in water.

Adjusting screws 32 regulate the spacing between the condenser plates 24 and 30. Alternatively it would be possible to provide, through the fixture 20, an adjusting screw to the stem 22 for regulating the spacing of the condenser plates 24 and 30.

Leads 34 from the condenser plates 24 and 30 connect to a conventional amplifier and oscillator shown generally by the box 36. Any type oscillator may be used, such as a relaxation oscillator which is highly stable and which has a capacitor in the circuit which controls frequency, so that the frequency is directly proportional to 1/capacitance.

The amplifier and oscillator output leads (not shown) are taken out through a seal from the strain gage 10 to a frequency meter or other appropriate meter for giving an indication of the amount of force or pressure, which may be steadily or oscillating.

Bores 38 throught the tube 18 and fixture 20 allow the strain gage to be evacuated through a passage 40. The passage 40 is then sealed leaving a vacuum within the strain gage. With a vacuum as a dielectric between the condenser plates 24 and 30, the effect of temperature on the dielectric constant is much less than if the dielectric were air. For example, the effect of temperature on the dielectric constant of air at atmospheric pressure is 2.2 parts per million per ° C. and less than 0.04 part per million per ° C. for a vacuum of 29.5 inches mercury.

A force or pressure is applied to the pistons 16. The force compresses the Ni Span C tube 18. The amount the tube compresses between the fixture 20 and the piston 14 (shown at the right in the drawing) is the amount the condenser plates 24 and 30 separate. This increase in condenser plate spacing 33 results in a change in the capacitance which controls the frequency of the oscillator, thus the change gives a measure of force or pressure etc.

The wide spacing along the tube 18 of the supports for the condenser plates 24 and 30 results in strain multiplication, the amount of increase in condenser plate spacing 33 is many times the amount of spacing increase that would result from the condenser plates being secured to the tube 18 at a close interval. For example, to obtain the ratio of the change in spacing to the initial spacing between condenser plates 24 and 30, and strain, which is also directly proportional to the ratio of the change in frequency to the original frequency output from the oscillator, is applied to the tube 18. The actual axial strain in the tube 18 is multiplied by the ratio of the distance between inner surface of fixture 20 and inner surface of piston 15 to the spacing between the condenser plates 24 and 30. The thickness of the wall of tube 18 is designed for the maximum pressure to which the gage will be subjected, thus the strain in this tube for a change of a unit of pressure decreases as the designed maximum pressure and thus tube thickness increases. For example, if the gage is designed for a maximum pressure of 1000 p.s.i or a depth of about 2240 feet in the ocean the wall thickness of the tube 18 will be about 1/16 of an inch for a gage outside diameter of 3 inches. For a unit of pressure change of 1 p.s.i. the resulting strain in the Ni Span C tube will be $0.6-10^{-6}$. The ratio of the change in spacing to the original spacing of 0.001 inch is $0.6-10 \times 2.5/0.001$ or $1.5-10^{-3}$ if the spacing between the inner surface of fixture 20 and inner surface of piston 15 is 2.5 inches. The strain multiplication is 2500.

An example of dimensions would be a condenser plate 24 two inches in diameter and a spacing between the condenser plates at atmospheric pressure of 0.001 inch. The plates should be parallel to 0.001 inch for best results. These dimensions are intended to be illustrative only and are intended in no way to be restrictive.

The stray capacitance should not exceed 20% of the plate capacitance for the best results. The mating area of the condenser plates 24 and 30 should be as large as possible to make the stray capacitance effect negligible.

The condenser plate 24 could be on the fixture 20 side of the second condenser plate 30. In such an arrangement the condenser plate spacing 33 will decrease when force is applied to the pistons. Conversely if the strain gage is constantly under a heavy force and the force is lessened then the plate spacing will increase.

It will be understood that various changes in the details, proportions and arrangements of parts, which have been herein described and illustrated in order to explain the nature of the invention, may be made by those skilled in the art within the principle and scope of the invention as expressed in the appended claims.

What is claimed is:
1. A depth gage comprising:
  an evacuated housing;
  piston means within each end of the said housing;
  a tube fastened to the said pistons and responsive to a force applied to the said pistons; and
  means responsive to the response of the tube and pistons for indicating the amount of force applied to the said pistons.
2. A depth gage according to claim 1 wherein the said tube is made of Ni Span C so that the depth gage is substantially independent of temperature effects.
3. A depth gage according to claim 1 wherein the means for measuring force comprises condenser plates in juxtaposition within the evacuated housing and being supported from spaced portions along the said tube.
4. A capacitive strain gage comprising:
  a housing;
  pistons closing each end of the housing;
  a tube secured between the pistons;
  a first condenser plate support means fastened towards one end of the said tube;
  a second condenser plate support means fastened at the other end of the said tube;
  a first condenser plate bonded to but insulated from said first condenser plate support means;
  a second condenser plate bonded to but insulated from said second condenser plate support means;
  means responsive to the variations in spacing of the condenser plates for giving measurement of the amount of force applied to the pistons; and
  means for evacuating the spacing between the said condenser plates.
5. A strain gage according to claim 4 wherein the condenser plates are on opposite sides of each other from their supports.
6. A strain gage according to claim 5 wherein the spacing of the condenser plates under normal atmospheric conditions is 0.001 inch.
7. A strain gage according to claim 6 wherein there are adjusting means for adjusting the spacing of the condenser plates.
8. A strain gage according to claim 4 wherein the tube is made of Ni Span C whereby temperature changes have no noticeable effect on the accuracy of the force measurement.
9. A strain gage according to claim 4 wherein said first condenser support means comprise a cylinder supported by one piston and a closure supported by the wall of the said tube wherein any strain on the tube is multiplied over the total length the condenser support means are spaced.
10. In a hydrophone for measuring force applied the novel feature comprising:
  an evacuated housing;
  piston means within each end of the said housing;
  a tube fastened to the said pistons and responsive to a force applied to the said pistons;
  means responsive to the response of said tube and pistons for indicating the amount of force applied to the said pistons; and
  said last named responsive means comprises a condenser having a vacuum as a dielectric between the plates so that the capacitance is independent of temperature.
11. In a hydrophone according to claim 10 and further having said tube being made of a negligible temperature coefficient of expansion material, Ni Span C, so as to dispense with any need for temperature compensating devices.
12. In a hydrophone according to claim 11 and further comprising a condenser support means that are spaced as far apart along the said tube so as to take advantage of strain multiplication wherein the hydrophone is more sensitive and accurate since the amount of change of condenser plate spacing is greater.

References Cited by the Examiner
UNITED STATES PATENTS 2,367,866  1/1945  Humphreys et al. _____ 73—398
3,057,204  10/1962  Kreisman _____ 73—398

OTHER REFERENCES

Rideal et al.: "A Sensitive Manometer for Rapid Chemical Reactions." Journal of Scientific Instruments, volume 32, pp. 349 and 35, September 1955.

LOUIS R. PRINCE, *Primary Examiner.*
D. O. WOODIEL, *Assistant Examiner.*